United States Patent
Goldman et al.

(10) Patent No.: US 7,697,488 B2
(45) Date of Patent: Apr. 13, 2010

(54) ORGANIZING COMMUNICATIONS IN A NETWORK

(75) Inventors: Ron Goldman, Los Altos, CA (US); Randy Smith, Palo Alto, CA (US); Rob Tow, Los Gatos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 499 days.

(21) Appl. No.: 11/647,100

(22) Filed: Dec. 28, 2006

(65) Prior Publication Data

US 2008/0159170 A1 Jul. 3, 2008

(51) Int. Cl.
*H04J 3/08* (2006.01)
*H04J 3/00* (2006.01)
*H04W 4/00* (2009.01)

(52) U.S. Cl. .................. 370/336; 370/338; 370/345

(58) Field of Classification Search .......... 370/254, 370/311, 318, 322, 376, 330, 336, 338, 345
See application file for complete search history.

(56) References Cited

U.S. PATENT DOCUMENTS

| | | | |
|---|---|---|---|
| 2004/0208152 A1* | 10/2004 | Perkins et al. ............. 370/338 |
| 2006/0227729 A1* | 10/2006 | Budampati et al. ......... 370/278 |
| 2007/0037609 A1* | 2/2007 | Zhang et al. ............... 455/574 |
| 2007/0047482 A1* | 3/2007 | Costa et al. ................ 370/328 |
| 2008/0144668 A1* | 6/2008 | Hall et al. .................. 370/503 |
| 2008/0232344 A1* | 9/2008 | Basu et al. ................. 370/350 |
| 2008/0259877 A1* | 10/2008 | Habetha .................... 370/336 |

* cited by examiner

*Primary Examiner*—Alpus H Hsu
*Assistant Examiner*—Jessica Clifton
(74) *Attorney, Agent, or Firm*—Brooks Kushman P.C.

(57) ABSTRACT

A method and system suitable for use in organize communications in a network. The organization process optionally being suitable to facilitating nodal communications so as to minimize energy consumption and activity periods associated with nodal communications. The process being adaptable for use with any number of nodes, such as but not limited to nodes associated with wireless sensor nets or other networks.

20 Claims, 3 Drawing Sheets

ORGANIZING COMMUNICATIONS IN A NETWORK

BACKGROUND OF THE INVENTION

1. Field of the Invention

The present invention relates to organizing networks having a number of nodes, such as but not limited to wireless sensors, configured to electronically communicate information.

2. Background Art

One of the main power costs in wireless sensor networks or other networks is energy consumption associated with an active/powered radio receiver/transceiver used to facilitate nodal communications. In order to prolong battery life and otherwise limit power consumption, it can be advantageous to minimize an amount of time that the receiver is active, i.e., to reduce the window in which it listens for and/or communicates information.

In order to minimize this so called communication window, each node may be configured to listen (be active) for a period of time and to be turned off (inactive) for another period of time. Energy saving increases as the inactivity period increases. Because each node typically relies on communicates from the other nodes for processing and other operations, the period for which each is active and inactive may be synchronized so that nodes all are listening for the same period of time and inactive for the same period.

Beaconing is one process for synchronizing nodal communications in which nodal activity states are coordinated. Beaconing generally relates to activating each node to listen and communicate during a beaconing window and to deactivate during a period of time outside of the beaconing window. To limit communication collisions and otherwise facilitate communications, each node may be assigned its own time slot within the window in which they are to transmit data packets, if the transmission of data packets is desired. Each node, therefore, listens to the packets communicated from the others within beaconing window, and transmits without fear of collision.

Current approaches to establishing the beaconing window rely on a centralized coordinator that defines when the listening window starts and ends, and assigns all the other nodes a slot in which to transmit. If the centralized coordinator node were to fail, new nodes arriving cannot be assigned a slot, and in many schemes even the existing nodes would become lost, as the start of each window may be marked by the coordinator. This is problematic. If the coordinator is lost or unavailable, the nodes essentially form a collection of peer nodes that must then include capabilities to detect coordinator presence and capabilities to facilitate mutually determining and selecting a common coordinator, adding extra complexity and costs. The coordinator is a single point of failure and maintaining such a coordinator can add complexity cost to the designing and supporting such a network.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
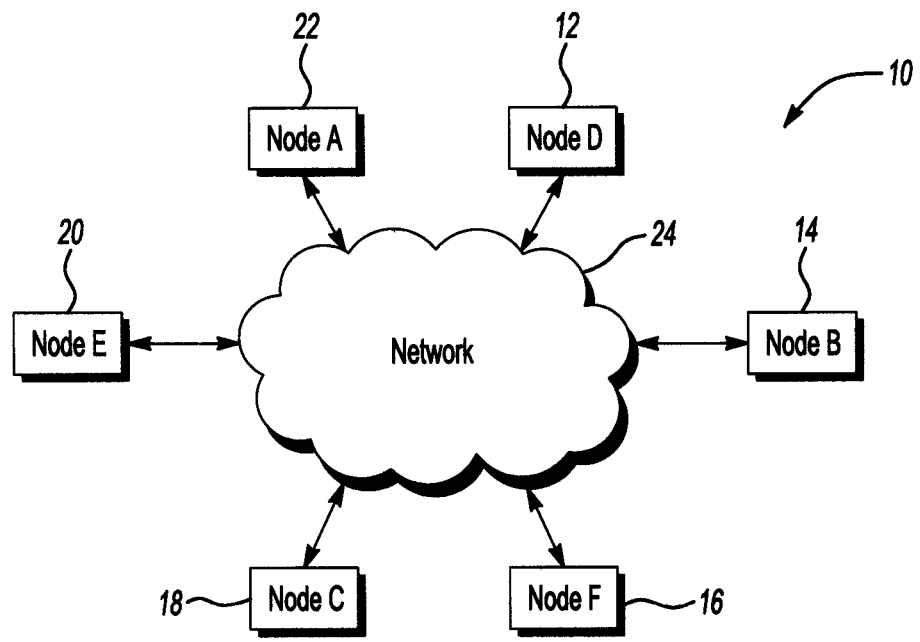
FIG. 1 illustrates a system in accordance with one non-limiting aspect of the present invention.

FIG. 1 illustrates a system 10 in accordance with one non-limiting aspect of the present invention. The system 10 relates to any arrangement where a number of nodes 12-22 electronically communicate with each other. The communications may be used to form a network 24. For exemplary purposes and without intending to limit the scope and contemplation of the present invention, the nodes 12-22 may be sensors configured to communicate data packets with other nodes 12-22.

The nodes 12-22 may be any type of device having capabilities sufficient to facilitate electronic communications, such as but not limited to communications suitable for transmitting and/or receiving data packets. The network 24 may include wireline and/or wireless features as defined by the communications between the nodes 12-22. Six nodes 12-22 are shown for exemplary purposes. The system 10 may include any number of nodes 12-22 spread out across any geographical area. The system 10 may be a mobile or flexible system where nodes 12-22 may be dynamically added and removed.

The nodes 12-22 may include processors, memories, and/or other features associated with executing the operations of the present invention. The nodes 12-22 may include software applications, interfaces, and/or other elements to facilitate controlling the operations thereof. Code, instructions, and other media may be downloaded, programmed, or otherwise imparted to the nodes to facilitate controlling, adjusting, and configuring nodal operations in accordance with the present invention. Optionally, as described below in more detail, one non-limiting aspect of the present invention may relate to controlling nodal operations so as to minimize a communication window and/or limit energy consumption.

The minimization of the communication window may correspond with peak energy consumption periods of the nodes 12-22 during which the nodes are active, i.e., listening for and/or transmitting data packets. This minimization of the communication window may correspond with maximization of a less-energy consuming period when the nodes 12-22 are not listing and/or broadcasting data packets. This optimization, for example, may be helpful in reducing energy consumption (costs) and prolonging nodal operating life.

The nodes 12-22 may be programmed or otherwise configured prior to deployment and/or at some point thereafter with an organizational methodology of the present invention. The organizational methodology may be used by the nodes 12-22 to determine their respective periods of activity and inactivity as a function of communications from the other nodes. This determination may be executed in a decentralized manner such that each node determines, adjusts, and/or updates its own periods of activity relative to the other nodal communications, and optionally, without instructions from a common coordinator.

Figure 2:
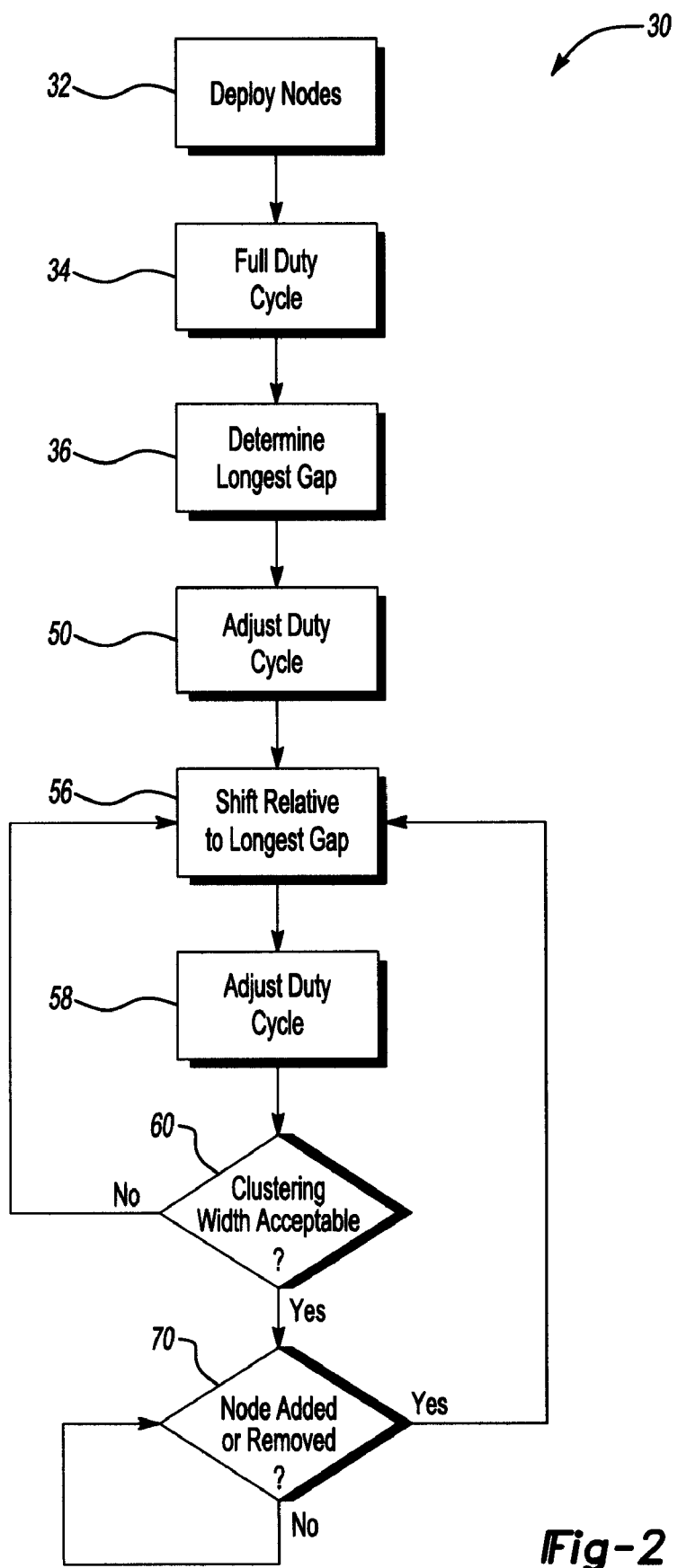
FIG. 2 illustrates a flowchart of a method of organization in accordance with one non-limiting aspect of the present invention.

FIG. 2 illustrates a flowchart 30 of a method of organization in accordance with one non-limiting aspect of the present invention. The method generally relates to organizing nodes so as to minimize a window in which the nodes are active. The window may correspond with a period of time in which the nodes are either communicating or listing for electronic data packets. The nodes may relate to and are contemplated to include any type of element having capabilities for electronic communications, and for exemplary purposes are most predominately described with respect to nodes commonly employed in sensor nets.

Block 32 relates to deploying a number of nodes. The number of nodes may correspond with the six nodes described in the system above and/or some other combination of nodes. The nodes may be assigned identifiers, such as IP, MAC, or other addresses/references. The nodal identifiers may be attached or otherwise used to identify packets and other information communicated from the nodes. The nodes may be deployed with and/or otherwise imparted with an organization algorithm or other logic associated with nodal organization in accordance with the present invention.

Block 34 relates to the nodes operating according to a full (100%) duty cycle. The duty cycle generally corresponds with a cycle associated with the nodes being activate and inactivate, or more particularly a cycle having a portion where the nodes are listening to and/or broadcasting data packets and a portion where the nodes are inactive or not listening to and/or broadcasting data packets. Each cycle may be define relative to an elapsed period of time, such as one minute, 10 seconds, one hour, etc. The cycle may continuously repeat such that each node includes at least one opportunity to communicate data packets per cycle.

The nodes may be configured to automatically begin broadcasting data packets upon deployment and/or in response to an activation signal or timing event. As is common in sensor nets, the nodes may be configured to monitor certain operating conditions for an environment, device, and/or other element in communication with or proximity thereto. This information may then be communicated in the form of electronic data packet to the other nodes and/or some other location.

The period of time in which the nodes are active may be characterized as a window. The window may define a beginning and end period during which all the nodes have an opportunity to broadcast and listen to data packets. As described above, the length/duration of this window may be directly related to energy consumption such that it may be desirable to limit its duration. The duty cycle describes the duration of the window relative to the entire elapse time of the cycle. For example, a 100% (full) duty cycle corresponds with the window occupying the entire cycle such that the nodes are always active. A 25% (quarter) duty cycle corresponds with the window occupying a quarter of the cycle such that the nodes are active for 25% of the cycle and inactive for the rest.

When active, the nodes may communicate packets at any time. The window, however, may include a number of slots for use in coordinating packet communications. Each node may be assigned a slot so as to limit packet collisions and other overlapping communications related issues. When initially deployed, the nodes may be unaware of the other nodes, their cycles, and/or slots. This can lead to packet collisions. The nodes may be programmed to randomly broadcast data packets when initially deployed in order to help prevent or limit the likelihood of multiple nodes broadcasting packets at the same time, i.e., during the same window slot.

Deploying the nodes with a fully duty cycle forces to the nodes to be active for the entire cycle. This allows the nodes to listen to all communications occurring over the corresponding cycle. If the each of the nodes are configured to broadcast once for a give cycle and the elapsed times of the cycle match, then each node is active long enough to listen all the other nodes in the system, as each node will broadcast once during the cycle. In some cases, the nodes may not broadcast during each cycle such that multiple cycles may be needed to ascertain packets from each node. The nodes may be configured to listen for all data packets and to store the identifiers associated therewith. After one or more cycles, the nodes may be able to identify the data packets broadcasted from the other nodes in the corresponding system.

Block 36 relates to determining a longest gap occurring over one cycle. The elapse time of the cycle may be the same for each node. Since each node may operate relative to the same elapse time and with a full duty cycle, the beginning and end each of cycle necessarily encompasses all broadcasts, regardless of whether the nodes individually start counting the elapse time from the same temporal reference point. The longest gap may be determined after each node listens to the other nodes. The longest gap generally corresponds with the longest time period between successive nodal communications, i.e., packet transmissions, which the nodes may be configured to individually determine.

Figure 3:
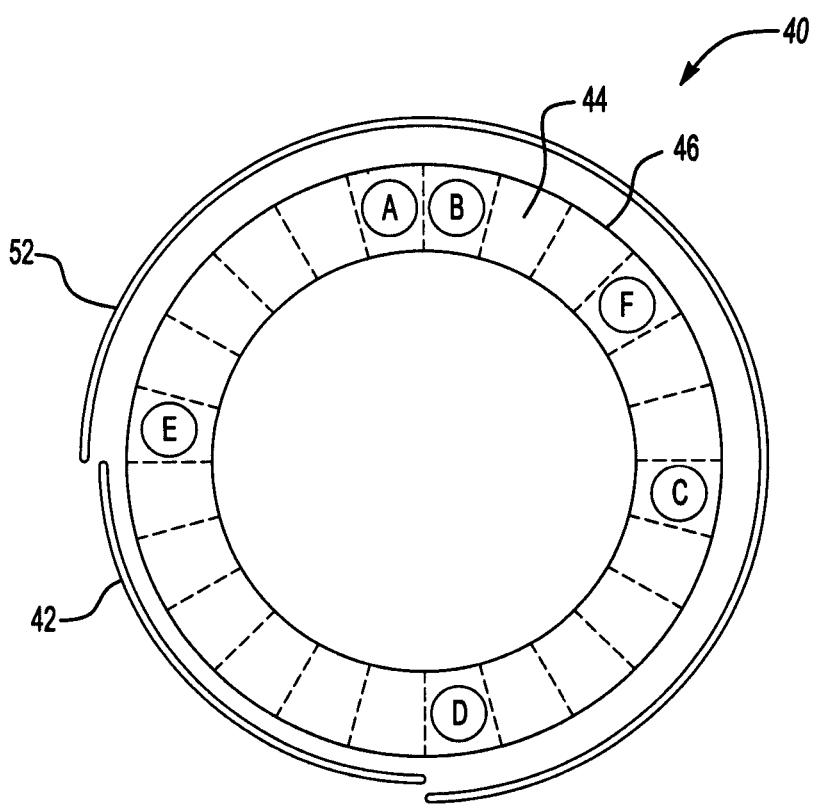
FIGS. 3-6 graphically illustrate communications in accordance with one non-limiting aspect of the present invention.

FIG. 3 illustrates a graph 40 of nodal communications in accordance with one non-limiting aspect of the present invention. A longest gap 42 may be determined from as a function of nodal communications. The nodal communications may correspond with initial deployment of the nodes and the nodes randomly broadcasting data packets. The data packets are referenced with characters A-F. The cycle may be represented with a circle 44 having a number of slots 46 for marking suitable periods for nodal communications. The slots 46 are temporal divisions within the circle 44 to generally reference a length of time allocated to a single nodal transmission. The number of slots within the cycle may be vary as a function of a desired period allocated for each nodal communication.

The random broadcasting of each node may result in the nodes broadcasting during different periods of time. Each slot between the nodal broadcasts may be considered as a gap. The nodes may listen to all the broadcasts and determine a longest gap as a function thereof. Each node may be configured to determine the gaps and to identify the longest gap 42. With respect to FIG. 3, each node may determine a two slot gap between packet B and packet F, a two slot gap between packet F and packet C, a four slot gap between packet C and packet D, a six slot gap between packet D and packet E, and a four slot gap between packet E and packet A. The longest gap, therefore, occurs between packets D and E and is equal to six slots.

Block 50 relates to adjusting the duty cycle of the nodes after determining the longest gap 42. Each node may be configured to automatically adjust their respective duty cycle as a function of the gap analysis described above such that the duty cycle adjustments may be made without the need for a common coordinator. The duty cycle adjustment may correspond with adjusting the period of time associated with a window 52, i.e., the period of time in which the nodes are active. The duty cycle adjustment may be based on the longest gap 42 such that the nodes adjust their duty cycles to be inactive during the period time associated with the longest gap.

In this manner, the nodes may be able to automatically adjust their duty cycles so as to limit energy consumption and to do so in a decentralized manner. The window (duty cycle) 52 may be selected to overlap the longest gap 42 in order to provide additional time to for supporting nodal communications. If multiple gaps are equal such that there is no unique longest gap, but several gaps of equal value, the nodes may randomly select which one of the gaps to be considered as the longest gap. The nodes may randomly select the same or different gaps to be the longest gap and then use that gap for subsequent adjustments.

Block 56 relates to shifting or otherwise adjusting the time period in which one or more of the nodes communicate data packets. The nodes may be configured to continuing broadcasting data packets during the time period randomly selected upon initial deployment. Thereafter, and optionally after each node in the system is identified, the nodes may be configured to automatically shift their positioning relative to the other nodes. The longest gap 42 may be used as a basis to facilitate such shifting. The longest gap 42 may be used to provide a common reference point to synchronize nodal communications relative to a common starting point or benchmark. Each node, according to a formula or other feature commonly programmed into each node, may shift positions relative to the longest gap 42 and their neighboring nodes, i.e. the nodes immediately preceding and succeeding their communication slot.

Figure 4:
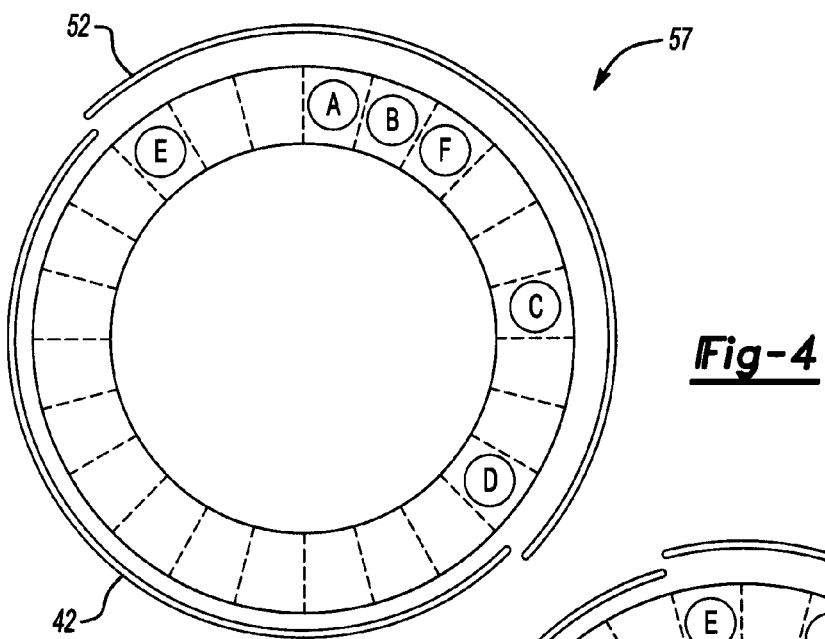

The shifting generally relates to re-positioning the nodes, or more particularly, the time period in which the nodes communicate (slots), relative to their prior time slot and as a function of the longest gap 42. This may include shifting the nodes away from the longest gap 42. FIG. 4 illustrates a graph 57 associated with shifting of the nodes in accordance with one non-limiting aspect of the present invention. This shifting may generally be characterized as shifting away from the longest gap 42 as each node is shift in a direction away from the longest gap 42. If there are multiple longest gaps of equal value, the nodes may randomly select the longest gap for use in facilitating shifting. This gap may correlate with the longest gap used to adjust the duty cycles in Block.

The nodes may automatically shift after each node is identified and a determination of the number of nodes is made individually by each node. The nodes may shift without instructions from the other nodes or a centralized common controller such that the nodes shift in a decentralized manner. The shifting may be characterized as an automated, self-organization of the nodes. The shifting shown in FIG. 4 corresponds with the nodes having larger gaps shifting two slots and the nodes having smaller gaps or no gaps relative to their neighbor shifting one slot. The shifting increment need not be fixed and may be determined by each node individually.

Block 58 relates to adjusting the duty cycle in a manner similar to that described above with respect to the duty cycle adjustment of Block 50. The shifting in Block 56 may alter the nodal broadcasting periods relative to their positioning prior to shifting. If the shifting occurs relative to the same longest gap 42, the shifting likely will result in the nodal gaps becoming closer together such that the period associated with the longest gap 42 increases. The duty cycle may then be adjusted to correspond with the lengthening of the longest gap.

Block 60 relates to determining a clustering width. The clustering width may correspond with the time period elapsing between each node on either end of the longest gap, i.e., nodes E and D. In FIG. 4, the clustering width corresponds with 12 slots. Because each node may be required to listen to the broadcasts from other nodes, the nodes may be need to be active for at least a period of time corresponding with the clustering width. The clustering width, therefore, may be related to a desired or preferred activity window 52 for nodal communications. The nodes may individually determine the clustering width and compare it to a common clustering goal programmed into each node. The goal may be determined as a function of the number nodes in the system and any number of other variables.

For example, the clustering objective may specify a desired bunching for the nodes such that the nodal gaps are eliminated. This objective is dependent on the number of nodes in the system, and for the illustrated six nodes, would require a clustering width of six gaps. The current clustering width is 12 gaps such that the clustering goal has yet to be obtained. The clustering goal may also include other parameters, such as but not limited to parameters related to packet loss and other nodal communication variables. Packet loss generally corresponds with the likelihood that one or more packets were not received or properly process. The clustering width goal may include allowances for additional or larger widths so as to provide space for nodes that may have been missing or otherwise ignored during the clustering width computation, such as for adding new nodes.

Figure 5:
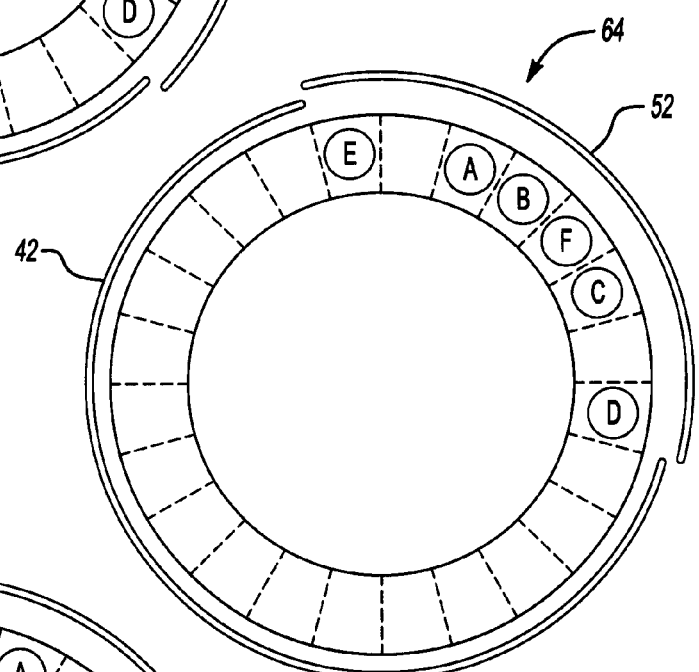
Figure 6:
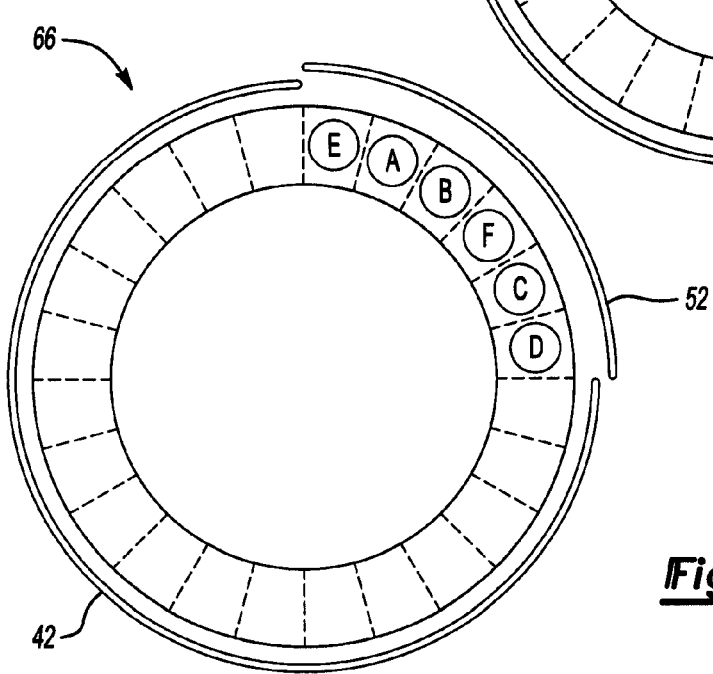

If the clustering width is greater than the clustering goal, the nodes may be configured to automatically execute another shifting operation. Block 56 may be returned to facilitate additional shifting. FIG. 5 illustrates a graph 64 associated with this shifting of the nodes in accordance with one non-limiting aspect of the present invention. Optionally, the duty cycle may be adjusted in Block 58 to take advantage of additional bunching of the nodes. Block 60 may be returned to for reevaluating the clustering width against the clustering goal. This loop may be repeated until the desired clustering goal is achieve. FIG. 6 illustrates a graph 66 associated with completion of the shifting wherein a desired clustering goal of zero gaps is achieved.

Block 70 relates to achieving the desired clustering goal and monitoring the nodal participation. This may include dynamically monitoring for the addition or loss of nodes. The additional of nodes may be determined when new nodes are added to the system and begin broadcasting new data packets. The new nodes may be determined by the existing nodes as a function of the identifiers associated therewith. Optionally, the duty cycle adjustment of Block 58 may include allowances for extending the window beyond the clustering with or otherwise providing tolerances suitable for allowing the existing nodes an opportunity to listen for new nodes.

This may include extending the window beyond one of the end nodes (nodes E and D). The new nodes may be configured to listen to nodal communications and to begin broadcasting at a tail end of the window, i.e. before or after one of the end nodes. If new nodes are determined, each node may automatically repeat the loop associated with Blocks 56-60 so as minimize the clustering width and window size in response to adding one or more nodes. Optionally, the clustering goal may be adjusted to compensate for the new node(s).

Nodes may be lost from the system for any number of reasons, such as but not limited to nodal failure and/or replacement. The loss of nodes may be automatically determined by the other nodes after a number of cycles are completed without communications from previously identified node(s) or through some other notification process. Similarly, each node may automatically repeat the loop associated with Blocks 56-60 so as minimize the clustering width and window size in response to losing one or more nodes. Optionally, the clustering goal may be adjusted to compensate for the lost node(s).

If no nodes are added or lost, the system may continue to operate in Block 70. This may include the nodes continuously cycling at the specified duty cycle and so as to provide the sensor net arrangement and to facilitate executing the operations associated therewith. Because each node may be independently programmed with common objectives that may be independently determined as a function of communications from the other nodes, one non-limiting aspect of the present invention is able to provide nodal system where the nodes may automatically and independently maximize power savings and other operations in a decentralized manner. Nodes may be dynamically added and removed with limited processing demands on the existing nodes.

The organization process described above generally relates to adjusting nodal communications as a function of a longest gap occurring between nodal broadcast. Such a methodology is provided for exemplary purposes and without intending the limit the present invention. The present invention fully contemplates any number of methodologies and organization processes for supporting the nodal system in a decentralized manners. Such contemplated methodologies may similarly rely on the nodes being independently positionable as function of other nodal communications.

One such methodology may be generally referred to as a densest region methodology. This process may rely on the deployed nodes determining a densest region. For example, instead of determining the longest gap for the nodal assignment associated with FIG. 3, the nodes may be configured to determine the densest region of nodes. This may include the nodes listening to communications from all of the nodes and shifting, in a manner similar to that describe above, towards the densest region of nodes, i.e., nodes A and B. The shifting may occur in an incremental manner with periodic duty cycle adjustments and/or in a single operation. Thereafter, the additional or subtraction of nodes may be monitored and compensated for in a manner similar to that described above.

Another such methodology may be generally referred to as a characterization methodology. This process may use the nodal identifiers to facilitate positioning. Each node may include an algorithm for processing the identifiers into a numerical value as a function of the address associated therewith and/or the address themselves may include numerical values, such as but not limited to the addresses being associated with pre-assigned or unique serial numbers. The nodes may thereafter automatically position themselves in sequential order or some other suitable order according to the numerical values. The grouping or tightness of the ordering may be facilitated in a manner specified in the desired clustering width or other feature programmed into the nodes.

As generally supported above, one non-limiting aspect of the present invention may relate each node initially choosing a slot at random. As it hears other nodes broadcasting, each node may shift its own transmit time so as to cluster all the transmissions. The nodes may do this by moving their respective transmit times closer to the node that broadcast immediately before or after itself. Which node it chooses may be based on which will minimize the period over which transmissions occur. One way to do so may be to shift away from the longest gap between two transmissions. If both directions are equal valued one may be chosen based on a random number generator. The transmission time shift can also be selected using a suitably initialized random number generator, which ensures that nodes behave differently although using the same rule set.

One non-limiting aspect of the present invention may relate to the nodes having capabilities to self-organize. During the self-organizing period the nodes may wait for each packet to be sent and to keep track of the start and end of the longest gap between packets. The nodes may also record information about the node that transmits immediately after its node does. The nodes may periodically transmit a packet identifying themselves and to record information about the other nodes that transmits immediately before it does. Each time through the cycle the nodes may adjusts when they will next transmit, moving closer to the time when either of the previous or next node transmits. That longest gap will then grow and will end up as the time that all of the nodes can safely turn off their radios to conserve power.

By not requiring a centralized coordinator, the present invention may simplify and make more robust the process whereby all nodes cluster their transmissions and only need to have their radios on for a short period. This may be especially useful in wireless sensor nets composed of mobile nodes that come and go within a geographical area, or which suffer from transmission and reception interference resulting in availability/unavailability within the ad-hoc network. This may also makes writing the application code for the sensor nodes easier since they may all do the same tasks. It may also make the overall system more robust as it may no longer need to rely on a centralized node that might fail.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of organizing a network having a number of nodes wherein each node is configured to sense a condition and to periodically transmit a wireless message reflective of the sensed condition during an individually assigned time slot wherein a window defines a period of time at least equal to a sum of the time slots required for all the number of nodes to transmit the message once, the window repeating after a last one of the number of nodes transmits the message so that another one of the messages can be transmitted by each node to reflect subsequent sensing of the condition, the method comprising:

during an intermediary period elapsing between successive windows, two or more of the nodes assessing whether messages were transmitted during each time slot of the preceding window and temporally shifting time slots to an unused time slot in a direction away from a longest gap of consecutively unused time slots in order to reduce a duration of the window.

2. The method of claim 1 further comprising configuring the nodes to automatically shift time slots such that the nodes self-organize in a decentralized manner.

3. The method of claim 1 further comprising the nodes initially randomly selecting the time slots and thereafter shifting time slots.

4. The method of claim 1 further comprising shifting the time slots after each node communicates at least one message in the form of a packet.

5. The method of claim 1 further comprising adding a new node to the network and shifting the time slots after the new node communicates at least one packet.

6. The method of claim 5 further comprising limiting the new node to communicate at least one message until after the last message is communicated from the other nodes such that the new node is automatically added to a tail of the time slots.

7. The method of claim 1 further comprising determining a lost node and shifting the time slots as a function of a new gap associated with the lost node.

8. The method of claim 1 further comprising adjusting a duty cycle associated with the nodal communications as a function of a clustering width, the clustering width associated with an elapse time occurring between communication of a first and last message.

9. The method of claim 8 further comprising adjusting the duty cycle as a function of a packet loss variable so as to compensate for lost packets.

10. The method of claim 1 further comprising each node being prohibited from wirelessly communicating during the intermediary time period, thereby requiring all wireless nodal communications to take place within the window.

11. The method of claim 10 further comprising each node being continuously active during the window in either one of a transmit state and a receive state, the transmit requiring nodes to be active in a manner that permits transmission of messages during the assigned time slot, the receive state requiring nodes to be active in a manner that allows for receipt but not transmission of messages.

12. The method of claim 1 further comprising, in the event two longest gaps are determined, each node independently determining whether to shift away a first one or a second one of the two longest gaps.

13. A method of organizing a network having a number of battery operated nodes configured to switch between active and inactive communication states, the active communication state characterized by an ability to exchange data messages with the other nodes, the inactive communication state characterized by an inability to exchange data messages with the other nodes, the method comprising:

the nodes initially randomly communicating data messages to the other nodes;

the nodes identifying time slots during which each of the nodes randomly communicated data messages;

the nodes establishing a communication window to correspond with a first period of time elapsing from a first time slot to a last time slot, each node being in the active state throughout the duration of the communication window;

the nodes establishing an intermediary period to correspond with a second period of time elapsing between the last time slot and the first time slot, each node being in the inactive state throughout the intermediary period;

the nodes incrementally attempting to shift time slots during each subsequent cycle of through the intermediary period as a function of messages communicated from the other nodes in order to reduce a duration of the communication window.

14. The method of claim 13 further comprising shifting time slots as a function of gaps occurring between time slots wherein the shifting reduces the gaps and minimizes a duration of the communication window.

15. The method of claim 14 further the nodes comprising shifting time slots away from the longest gap, wherein the longest gap defined by a longest gap of unused time slots occurring between time slots during which messages were communicated.

16. The method of claim 15 further comprising, in the event two longest gaps are determined, each node independently determining whether to shift away a first one or a second one of the two longest gaps.

17. The method of claim 13 further comprising shifting the time slots toward a densest region of time slots.

18. A network comprising:

a number of nodes configured to transmit messages during separate time slots within a recurring communication window, wherein the nodes are active throughout the recurring communication window in order to receive messages from the other nodes, wherein the communication window at least initially includes a number of unused time slots between a first and last used time slot;

wherein the nodes are configured to automatically shift their time slot away from a longest gap of unused time slots in order to reduce a duration between the first and last used time slot; and in the event two longest gaps are determined of equal length, each of the nodes randomly and independently determining whether to shift away a first one or a second one of the two longest gaps.

19. The system of claim 18 wherein the nodes are configured to position their time slots to sequentially align according to nodal identifiers associated therewith.

20. The system of claim 18 wherein the nodes are configured to adjust duty cycles as a function of communication of the other nodes so as to minimize power consumption.

* * * * *